(12) United States Patent
Jin et al.

(10) Patent No.: US 7,570,699 B2
(45) Date of Patent: Aug. 4, 2009

(54) QAM SYMBOL MAPPING METHOD AND APPARATUS FOR DOWNSTREAM TRANSMISSION OF A CABLE MODEM

(75) Inventors: Eun Sook Jin, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 703 days.

(21) Appl. No.: 11/296,062

(22) Filed: Dec. 6, 2005

(65) Prior Publication Data

US 2006/0140299 A1    Jun. 29, 2006

(30) Foreign Application Priority Data

Dec. 8, 2004    (KR) ...................... 10-2004-0102911

(51) Int. Cl.
H04L 5/12    (2006.01)
H04L 23/02    (2006.01)
(52) U.S. Cl. ...................... 375/261; 375/298
(58) Field of Classification Search ................ 375/298, 375/261

See application file for complete search history.

(56) References Cited

FOREIGN PATENT DOCUMENTS

| GB | 2334862 | * | 9/1999 |
|---|---|---|---|
| KR | 1020000014483 | | 3/2000 |

* cited by examiner

*Primary Examiner*—Kevin M. Burd
*Assistant Examiner*—Nader Bolourchi
(74) *Attorney, Agent, or Firm*—Blakely, Sokoloff, Taylor & Zafman LLP

(57) ABSTRACT

Provided is a QAM (Quadrature Amplitude Modulation) symbol mapping method and apparatus for downstream transmission of a cable modem. The method includes the steps of: determining phase information on the basis of predetermined relations between two bits representing set partitioning information and two LSBs (Least Significant Bits) of bits representing amplitude information, among bits input for QAM symbol mapping; separating I and Q signals of a first quadrant from the bits representing the amplitude information; and mapping the I and Q signals of the first quadrant to actual positions on the basis of the determined phase information.

20 Claims, 9 Drawing Sheets

QAM SYMBOL MAPPING METHOD AND APPARATUS FOR DOWNSTREAM TRANSMISSION OF A CABLE MODEM

CROSS-REFERENCE TO RELATED APPLICATION

This application claims priority to and the benefit of Korean Patent Application No. 2004-102911, filed on DEC. 8, 2004, the disclosure of which is incorporated herein by reference in its entirety.

BACKGROUND

1. Field of the Invention

The present invention relates to a cable transmission system, and more particularly, to a QAM (Quadrature Amplitude Modulation) symbol mapping method and apparatus for a 64 QAM mode and a 256 QAM mode in downstream transmission.

2. Discussion of Related Art

In a cable transmission system, downstream transmission is performed according to ITU-T Recommendations J. 83, Annex B. FIG. 1 is a block diagram illustrating a conventional process of processing a downstream signal. In a process for a downstream modulation, a Moving Picture Experts Group (MPEG)-2 data stream input on a per-packet basis is framed in an MPEG frame unit 110, and then a forward error correction algorithm is applied in a Forward Error Correction (FEC) encoder 120, thereby obtaining reliable data corresponding to a channel. A FEC code output from the FEC encoder 120 is QAM-modulated through a QAM modulator 130 and transmitted as a Radio Frequency (RF) signal through a cable channel 140. Downstream demodulation is performed through a QAM demodulator 150, a FEC decoder 160, and an MPEG frame unit 170 in a process that is the reverse of modulation. The MPEG framing process provides a parity check pattern for packet synchronization between a transmitter and a receiver, and the QAM modulation process supports a 64 QAM mode and a 256 QAM mode. In the FEC encoding process, a concatenated coding method is used to correct error, which uses a Reed-Solomon code having 't' number of error correction abilities as an outer code and uses a Trellis Coded Modulation (TCM) code generating a coded modulation code as an inner code. According to this method, an error that is not corrected in an inner decoder can be corrected in an outer decoder, so that an error rate becomes virtually zero.

FIG. 2 is a detailed block diagram illustrating a procedure of FEC processing. As shown in FIG. 2, a FEC encoder includes a Reed-Solomon encoder 210, an interleaver 220, a randomizing unit 230, and a trellis encoder 240. A FEC decoder includes a trellis decoder 260, an inverse randomizing unit 270, a deinterleaver 280, and a Reed-Solomon decoder 290. The Reed-Solomon encoder 210 codes MPEG transport streams 128 and 122 using a RS block code. The RS block code is comprised of 128 symbols per block. Among them, only 122 symbols are information symbols, and six symbols are parities for error correction. Therefore, the RS block code performs error correction for up to a maximum of three symbols. The RS block code is used identically in the 64 and 256 QAM modes. The interleaver 220 is used to efficiently cope with an erroneous symbol (cluster error, burst error) generated in channel transmission. A convolutional interleaver structure is programmable in the 64 and 256 QAM modes and supports various interleaving modes. The randomizing unit 230 prevents the interleaved data from having a specific pattern by randomizing it, prevents an RF modulated signal from being mixed with signals of other channels, and enables extraction of synchronization at a receiver. The randomizing unit 230 generates a pseudo noise code predefined at the receiver, and adds input data to the generated pseudo noise code to output randomized data.

The trellis encoder 240 performs a TCM, which is a channel coding method for obtaining a high coding gain from a bandwidth-limited channel, and is embodied in a combined format of a coding technology and a modulation technology. The TCM structure is comprised of a 64/256 QAM modulator and a convolutional encoder having a limited state.

FIG. 3 is a block diagram illustrating a detailed structure of a conventional trellis encoder. As shown in FIG. 3, the trellis encoder separately includes a 64 QAM modulation system 300a and a 256 QAM modulation system 300b, and selects a suitable one of the two modulation systems according to a channel environment. Here, a symbol is mapped in each modulation mode using various differential coding methods, and accordingly, an input bit should be generated to have a phase and amplitude of the corresponding symbol. The 64 QAM modulation system 300a includes a data formatting unit 310a for receiving RS symbol bits from the randomizing unit and classifyiing the received RS symbol bits into group bits according to a predetermined rule; a coder 320a for receiving predetermined group bits from the data formatting unit 310a and coding the received group bits; and symbol mapping units 330a for receiving the non-coded group bits output from the data formatting unit 310a and the coded group bits output from the coding unit 320a and performing symbol mapping. In detail, the coder 320a includes a differential coder 322a and a Binary Convolution Coder (BCC). The 256 QAM modulation system 300b has substantially the same construction as the 64 QAM modulation system 300a.

Korean Patent Publication No. 2000-14483 entitled "QAM MAPPER AND DEMAPPER FOR DOWNSTREAM TRANSMISSION OF CABLE MODEM" discloses a QAM mapping apparatus in which, in order to reduce a size of a memory used in a symbol mapping lookup table, phase information of a QAM symbol is determined by mapping two convolution coded bits of a QAM-TCM modulation mode to any one of four phases according to a method for differential coding between QAM symbols continuous on a time axis, and amplitude information uses a remaining bit pair as is.

However, the QAM mapping apparatus has a drawback in that since the method for extracting the phase information of the QAM symbol differs depending on the differential coding methods, a hardware structure should be changed to match differential coding mechanisms. Further, since the QAM mapping apparatus also uses memory and therefore its operation speed is limited by memory access time, it is not suitable for a high-speed data transfer system.

Accordingly, it is required to develop a QAM symbol mapping apparatus that is capable of extracting the phase information of the QAM symbol irrespective of differential coding mechanisms and does not use a memory so that it can be suitably applied to a high-speed data transfer system.

SUMMARY OF THE INVENTION

The present invention is directed to implementation of a QAM symbol mapping method and apparatus for determining a QAM symbol irrespective of differential coding mechanisms.

The present invention is also directed to implementation of a QAM symbol mapping method and apparatus for determining phase information of a QAM symbol using certain relations between input bits, which may be obtained by analysis of a constellation diagram.

The present invention is also directed to implementation of a QAM symbol mapping method and apparatus for separating I and Q symbols from input bits representing amplitude information, using certain relations between input bits, which may be obtained by analysis of a constellation diagram, without using a memory.

One aspect of the present invention provides a QAM (Quadrature Amplitude Modulation) symbol mapping method, including the steps of: determining phase information on the basis of predetermined relations between two bits representing set partitioning information and two LSBs (Least Significant Bits) of bits representing amplitude information, among bits input for QAM symbol mapping; separating I and Q signals of a first quadrant from the bits representing the amplitude information; and mapping the I and Q signals of the first quadrant to actual positions on the basis of the determined phase information.

Another aspect of the present invention provides a QAM (Quadrature Amplitude Modulation) symbol mapping apparatus, including: a phase information extraction means for performing predetermined arithmetic operations between two bits representing set partitioning information and two LSBs (Least Significant Bits) of bits representing amplitude information, among bits input for QAM symbol mapping, to extract phase information; an I/Q signal separating means for separating I and Q signals of a first quadrant from the bits representing the amplitude information; and a mapping means for receiving the phase information from the phase information extraction unit, and mapping the separated I and Q signals of the first quadrant to actual positions on the basis of the received phase information.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the exemplary embodiments disclosed below, but can be implemented in various types. Therefore, the present exemplary embodiment is provided for complete disclosure of the present invention and to fully inform the scope of the present invention to those ordinarily skilled in the art.

Figure 4:
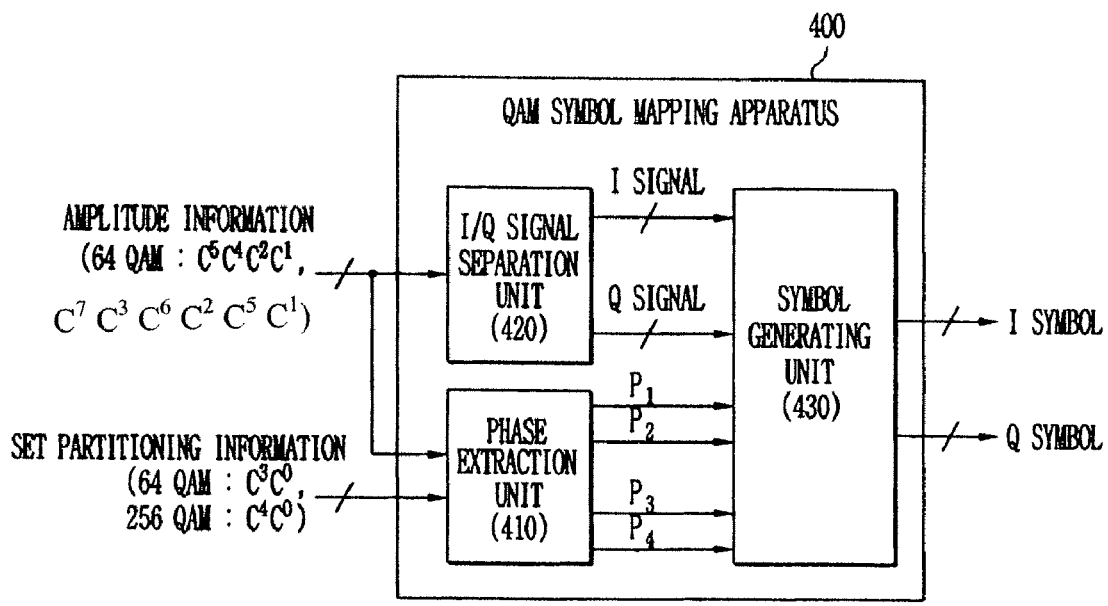
FIG. 4 is a schematic diagram illustrating a Quadrature Amplitude Modulation (QAM) symbol mapping apparatus according to an exemplary embodiment of the present invention.

FIG. 4 is a schematic diagram illustrating a Quadrature Amplitude Modulation (QAM) symbol mapping apparatus according to an exemplary embodiment of the present invention.

As shown in FIG. 4, the inventive QAM symbol mapping apparatus includes a phase extraction unit 410, an I/Q signal separation unit 420, and a symbol generation unit 430. The phase extraction unit 410 performs a logic arithmetic operation for predetermined input bits on the basis of a constellation diagram analysis result, thereby directly extracting phase information from the input bits. The I/Q signal separation unit 420 separates I and Q signals from amplitude information on the basis of the constellation diagram analysis result.

Figure 1:
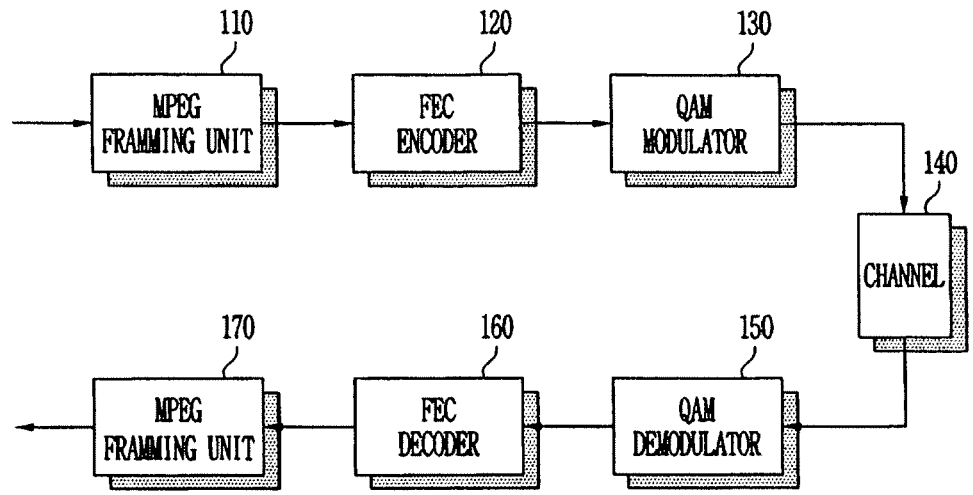
FIG. 1 is a block diagram illustrating a conventional process of processing a downstream signal.
Figure 2:
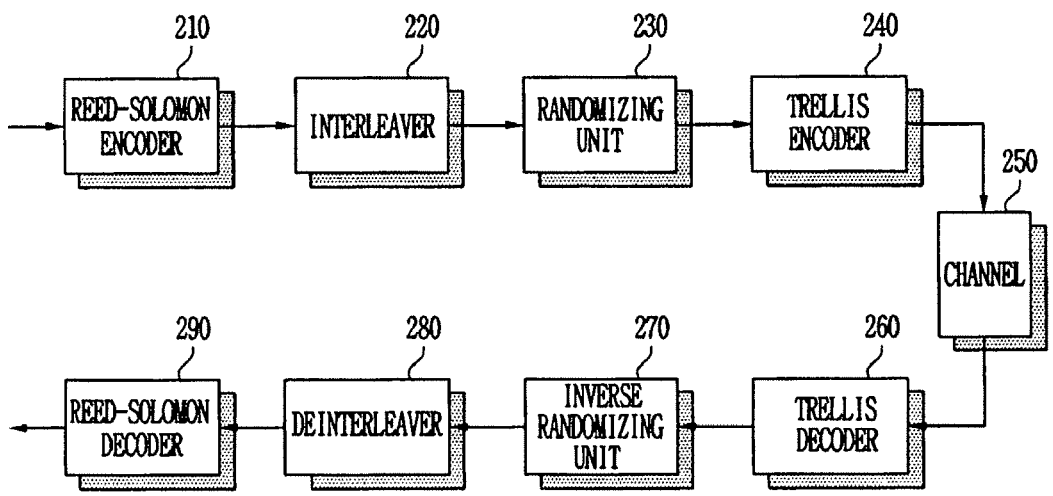
FIG. 2 is a more detailed block diagram illustrating a process of Forward Error Correction (FEC)
Figure 3:
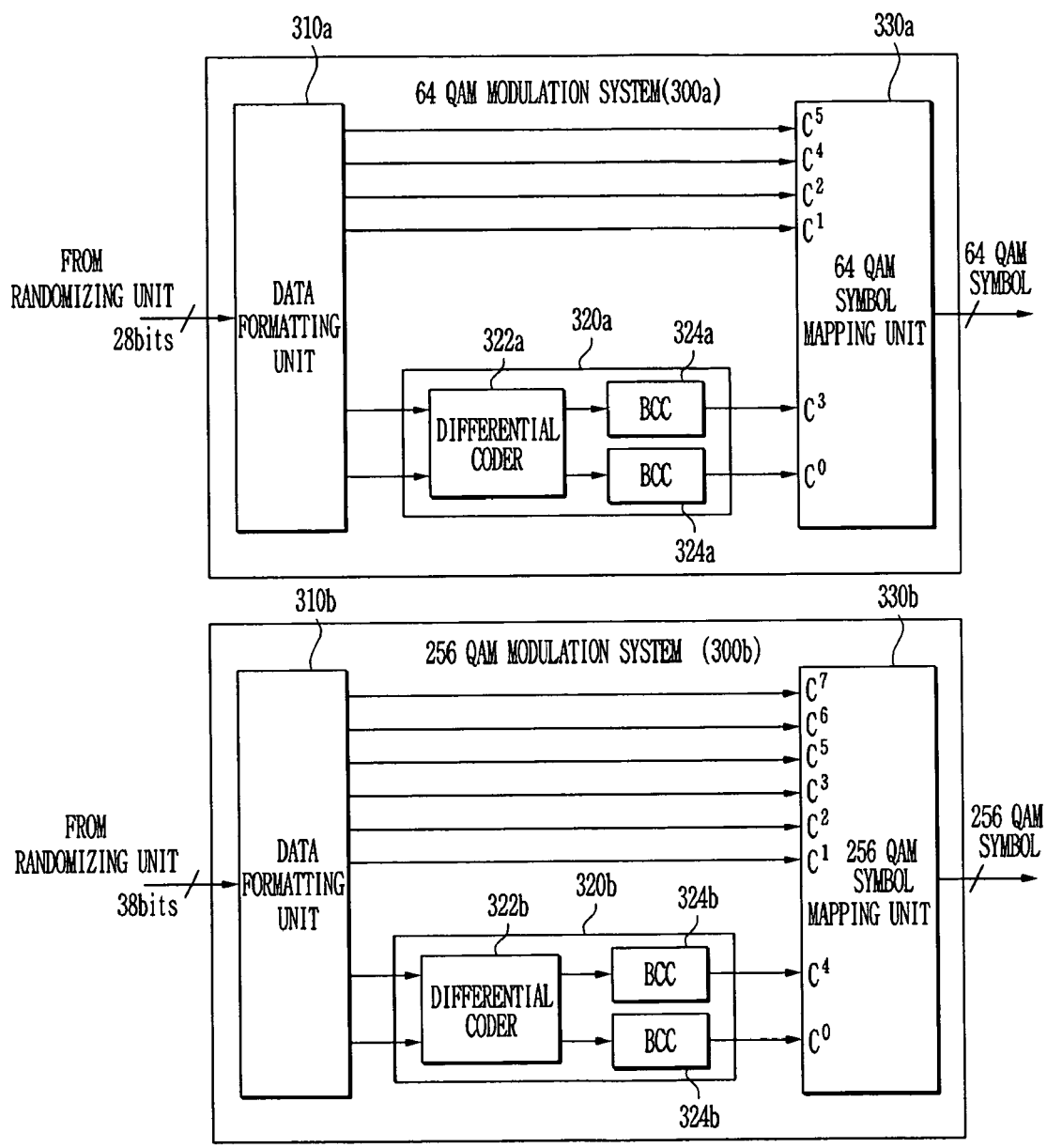
FIG. 3 is a block diagram illustrating a detailed structure of a conventional trellis encoder.
Figure 5:
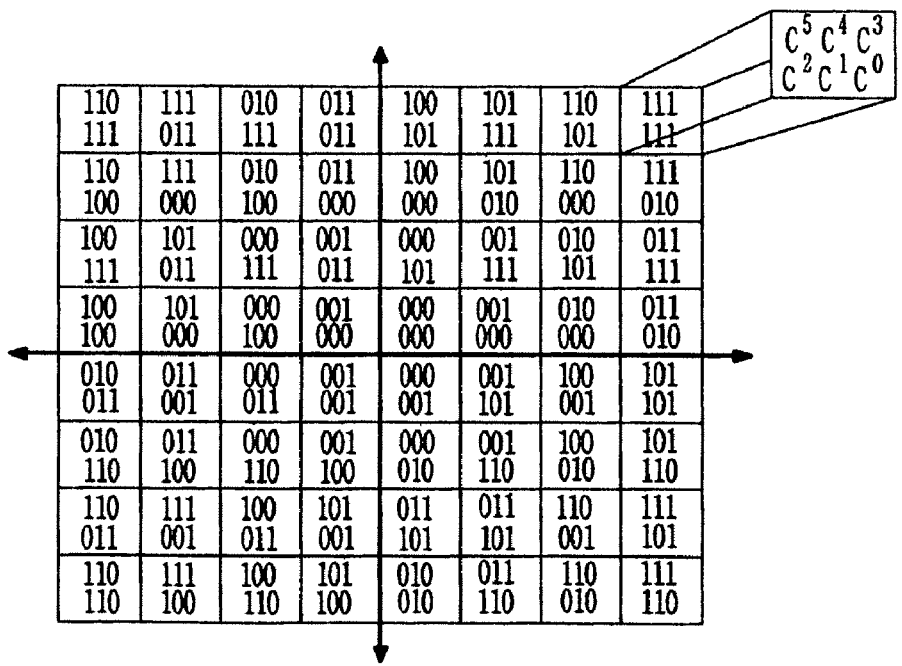
FIG. 5 is a 64 QAM constellation diagram used for downstream transmission of a cable modem.
Figure 6:
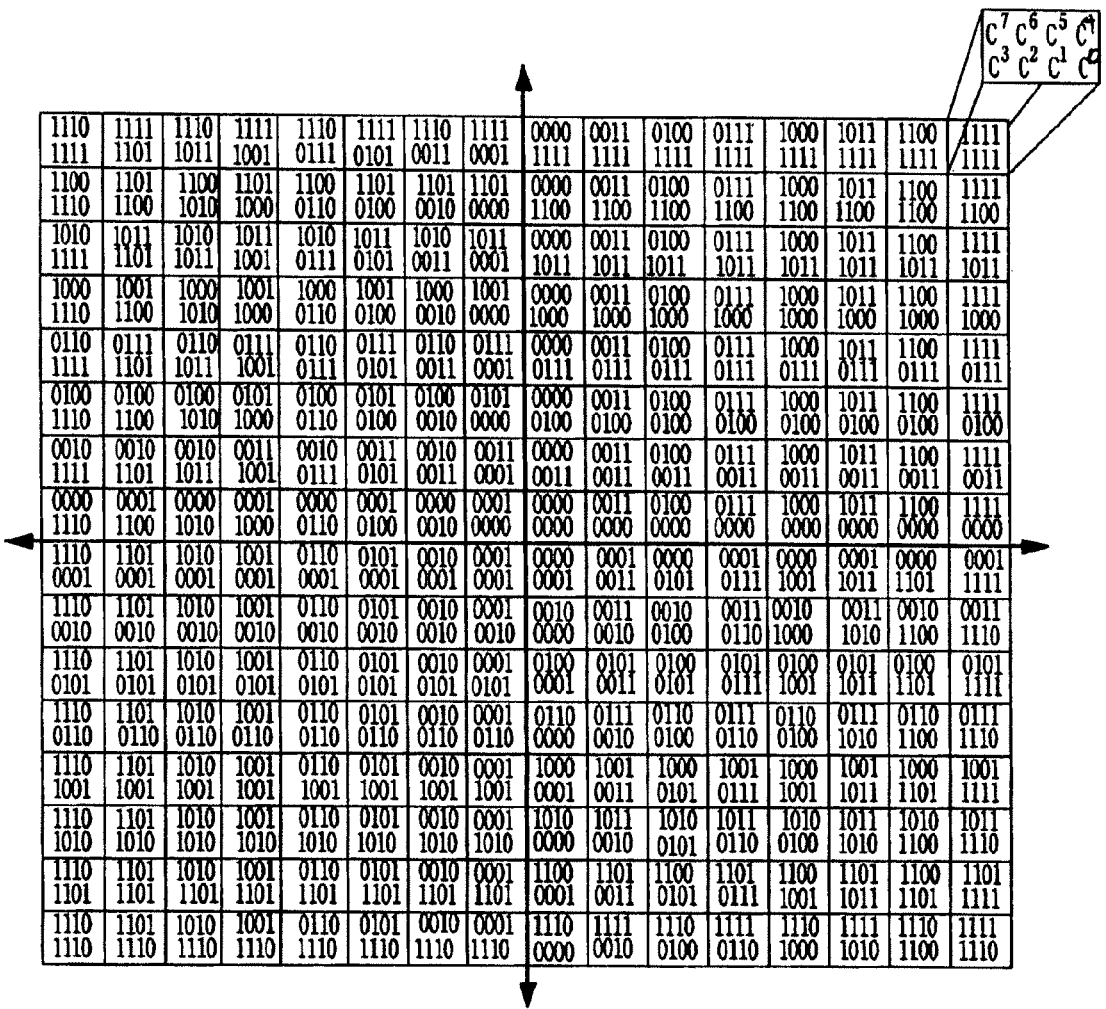
FIG. 6 is a 256 QAM constellation diagram used for downstream transmission of a cable modem.

First, to aid in understanding a bit signal input to the QAM symbol mapping apparatus 400, referring again to FIG. 3, it can be appreciated that bits input to QAM symbol mapping units 330a and 330b are classified as convolution coded bits and non-convolution coded bits. Since a portion of signals output from a data formatting unit of FIG. 3 is 90°-phase invariant coded by differential coders 322a and 322b, the remaining non-coded bits, i.e., the bits not passing through the convolution coders 324a and 324b, have a signal constellation having invariability for 90° rotation. Whereas, bits passing through the convolution coders are identically repeated irrespective of 90° rotation, according to a characteristic of set partitioning of Trellis Coded Modulation (TCM). FIGS. 5 and 6 illustrate constellation diagrams of 64 QAM and 256 QAM, respectively, used for downstream transmission of cable modems. FIGS. 7A and 7B and FIGS. 8A and 8B illustrate results of analyzing the constellation diagram of FIGS. 5 and 6, in consideration of a characteristic of input bit information.

Figure 7A:
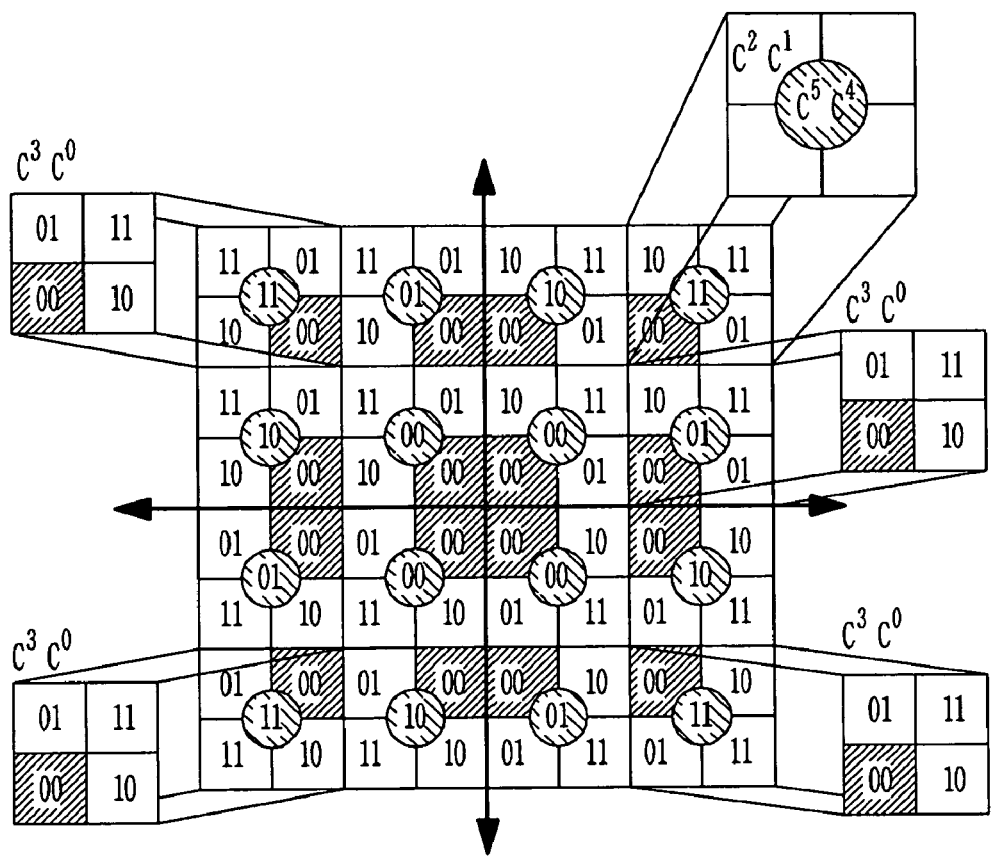
FIGS. 7A and 7B illustrate the result of analyzing a 64 QAM constellation diagram considering a characteristic of input bit information.

Referring to FIG. 7A, in the 64 QAM, bits $C^3$ and $C^0$ passing through the convolution coder 324a represent set partitioning information, and the remaining bits $C^5$, $C^4$, $C^2$, and $C^1$, which do not pass through the convolution coder 324a and have 90° rotation invariability, represent amplitude information with a sequence of $C^5C^4C^2C^1$, as a constellation analysis result. The set partitioning information $C^3$ and $C^0$ are identically repeated irrespective of 90° rotation and two Least Significant Bits (LSBs) $C^2$ and $C^1$ of the amplitude information have 90° rotation invariability. Therefore, the phase information of each symbol can be extracted using relations between $C^3$, $C^0$, $C^2$, and $C^1$. Below Table 1 represents the phase information based on the relations between $C^3$, $C^0$, $C^2$, and $C^1$ in the 64 QAM. Here, $P_1$, $P_2$, $P_3$ and $P_4$ denote phase values of a first quadrant, a second quadrant, a third quadrant, and a fourth quadrant.

TABLE 1

| $C^3C^0$ | $C^2C^1$ | | Phase output |
|---|---|---|---|
| 00 | 00 | $C^3 = C^1$ | $P^1$ |
| 01 | 10 | $C^0 = C^2$ | |
| 10 | 01 | | |
| 11 | 11 | | |
| 00 | 10 | $C^3 = \overline{C^2}$ | $P^2$ |
| 01 | 11 | $C^0 = C^1$ | |
| 10 | 00 | | |
| 11 | 01 | | |
| 00 | 11 | $C^3 = \overline{C^1}$ | $P^3$ |
| 01 | 01 | $C^0 = C^2$ | |
| 10 | 10 | | |
| 11 | 00 | | |
| 00 | 01 | $C^3 = C^2$ | $P^4$ |
| 01 | 00 | $C^0 = \overline{C^1}$ | |
| 10 | 11 | | |
| 11 | 10 | | |

As shown in Table 1, the phase information can be extracted through logic arithmetic operation between $C^3$ and $C^0$ representing the set partitioning information and $C^2$ and $C^1$ corresponding to the two LSBs of the amplitude information in the 64 QAM. In other words, "$P_1$" denoting the phase value of the first quadrant is output as "1" when $C^3=C^1$ and $C^0=C^2$ are simultaneously satisfied, otherwise, it is output as "0." "$P_2$" denoting the phase value of the second quadrant is output as "1" when $C^3=\overline{C^2}$ and $C^0=C^1$ are simultaneously satisfied, otherwise, it is output as "0." "$P_3$" denoting the phase value of the third quadrant is output as "1" when $C^3=\overline{C^1}$ and $C^0=C^2$ are simultaneously satisfied, otherwise, it is output as "0." "$P_4$" denoting the phase value of the fourth quadrant is output as "1" when $C^3=C^2$ and $C^0=\overline{C^1}$ are satisfied, otherwise, it is output as "0."

Figure 8A:
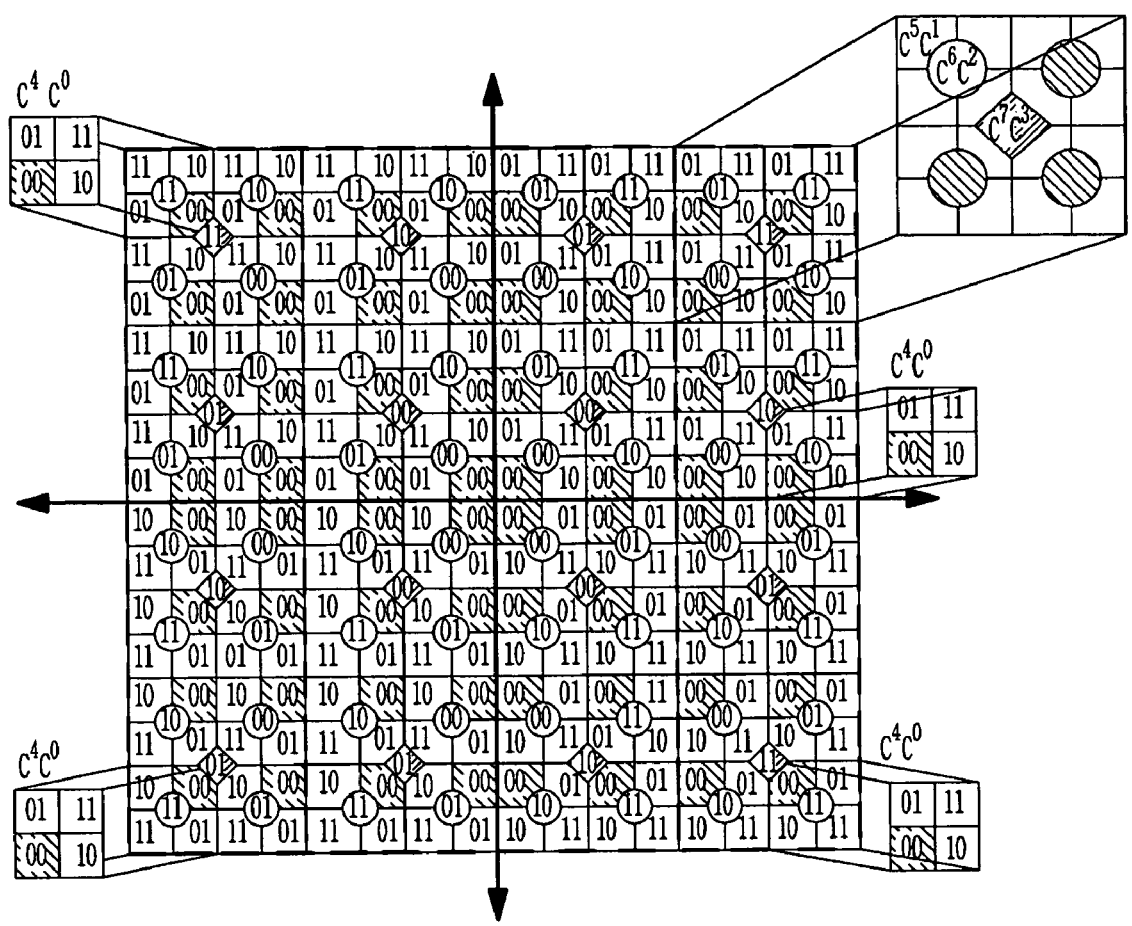
FIGS. 8A and 8B illustrate the result of analyzing a 256 QAM constellation diagram considering a characteristic of input bit information.

Similarly, referring to FIG. 8A where the 256 QAM constellation diagram is analyzed, it can be appreciated that the bits $C^4$ and $C^0$ coded through the convolution coder 324b represent set partitioning information, and the bits not coded through the convolution coder 324b represent amplitude information in the sequence $C^7$, $C^3$, $C^6$, $C^2$, $C^5$, and $C^1$. Accordingly, in the 256 QAM, the phase information of each symbol can be extracted using relations between $C^4$, $C^0$, $C^5$, and $C^1$. Below table 2 represents a phase output based on relations between $C^4$, $C^0$, $C^5$, and $C^1$ in the 256 QAM.

TABLE 2

| $C^4C^0$ | $C^5C^1$ | | Phase output |
|---|---|---|---|
| 00 | 00 | $C^4 = C^5$ | $P^1$ |
| 01 | 01 | $C^0 = C^1$ | |
| 10 | 10 | | |
| 11 | 11 | | |
| 00 | 01 | $C^4 = \overline{C^1}$ | $P^2$ |
| 01 | 11 | $C^0 = C^5$ | |
| 10 | 00 | | |
| 11 | 10 | | |
| 00 | 11 | $C^4 = \overline{C^5}$ | $P^3$ |
| 01 | 10 | $C^0 = \overline{C^1}$ | |
| 10 | 01 | | |
| 11 | 00 | | |
| 00 | 10 | $C^4 = C^1$ | $P^4$ |
| 01 | 00 | $C^0 = \overline{C^5}$ | |
| 10 | 11 | | |
| 11 | 01 | | |

As shown in Table 2, in the 256 QAM, only corresponding bits differ like $C^4=\overline{C^5}$ and $C^0=\overline{C^1}$, and the relations between two LSBs of the amplitude information and the set partitioning information are identical. In other words, the phase information "$P_1$" representing the first quadrant is output in the case the $C^4=C^5$ and $C^0=C^1$, the phase information "$P_2$" representing the second quadrant is output in the case the $C^4=\overline{C^1}$ and $C^0=C^5$, the phase information "$P_3$" representing the third quadrant is output in the case that $C^4=\overline{C^5}$ and $C^0=\overline{C^1}$, and the phase information "$P_4$" representing the fourth quadrant is output in the case that $C^4=C^1$ and $C^0=\overline{C^5}$.

Figure 9:
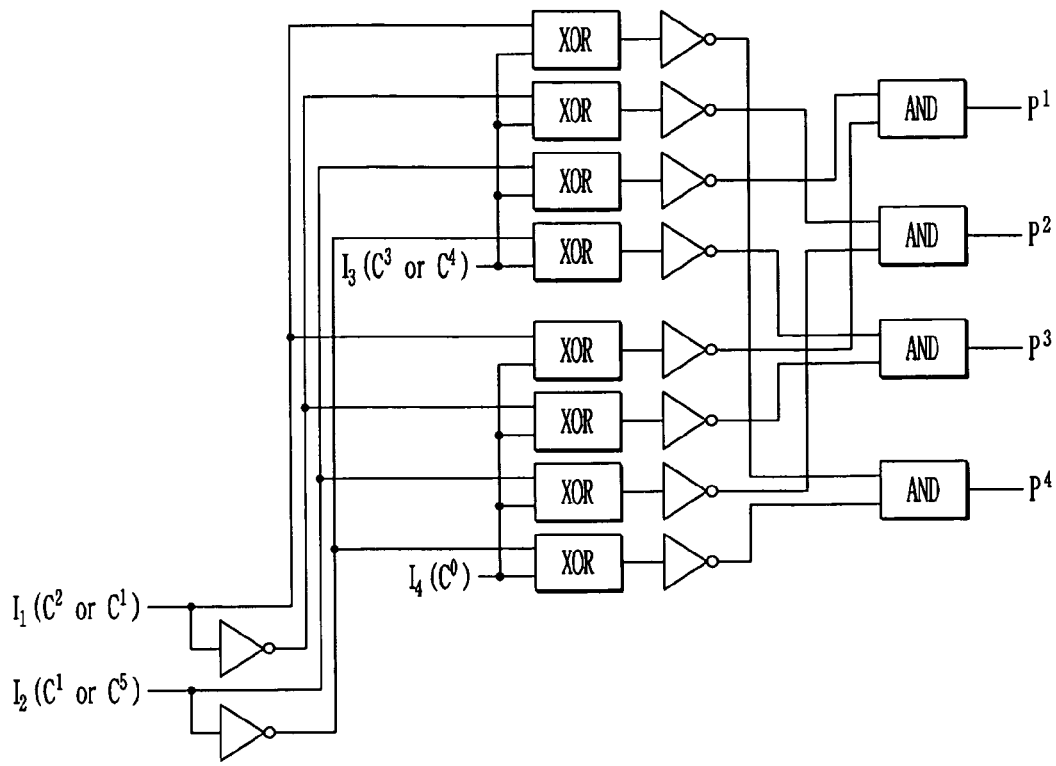
FIG. 9 illustrates a detailed construction of a phase extraction unit according to an exemplary embodiment of the present invention.

Accordingly, the inventive phase extraction unit 410 performs the logic arithmetic operations between the two bits of the set partitioning information and two LSBs of the amplitude information, based on the results of Tables 1 and 2, to extract the phase information of the symbol. A logic arithmetic circuit diagram of the phase extraction unit 410 is illustrated in FIG. 9 according to an exemplary embodiment of the present invention. In the exemplary embodiment, unlike conventional art, the phase extraction unit 410 can be embodied to control and share input bits in a 64 QAM mode and a 256 QAM mode. However, this exemplary embodiment is not intended to limit the present invention and it will be easily understood by those skilled in the art that only one of the 64 QAM and the 256 QAM modes can be embodied, or they can be separately embodied as needed.

The phase extraction unit 410 includes four input units $I_1$, $I_2$, $I_3$ and $I_4$. In the 64 QAM mode, the bits $C^2$ and $C^1$ corresponding to the two LSBs of the amplitude information are respectively input to the input units $I_1$ and $I_2$, and the bits $C^3$ and $C^0$ representing the set partitioning information are respectively input to the input units $I_3$ and $I_4$. In the 256 QAM mode, the bits $C^1$ and $C^5$ corresponding to the two LSBs of the amplitude information are respectively input to the input units $I_1$ and $I_2$, and the bits $C^4$ and $C^0$ representing the set partitioning information are respectively input to the input units $I_3$ and $I_4$. Phase extraction is performed through the logic arithmetic operations between the bits input to the input units $I_1$ and $I_2$, and the bits input to the input units $I_3$ and $I_4$. It will be understood by those skilled in the art that the logic arithmetic operation of FIG. 9 is one exemplary embodiment of the spirit of the present invention and should not be construed as restricting the scope of the present invention.

Figure 7B:
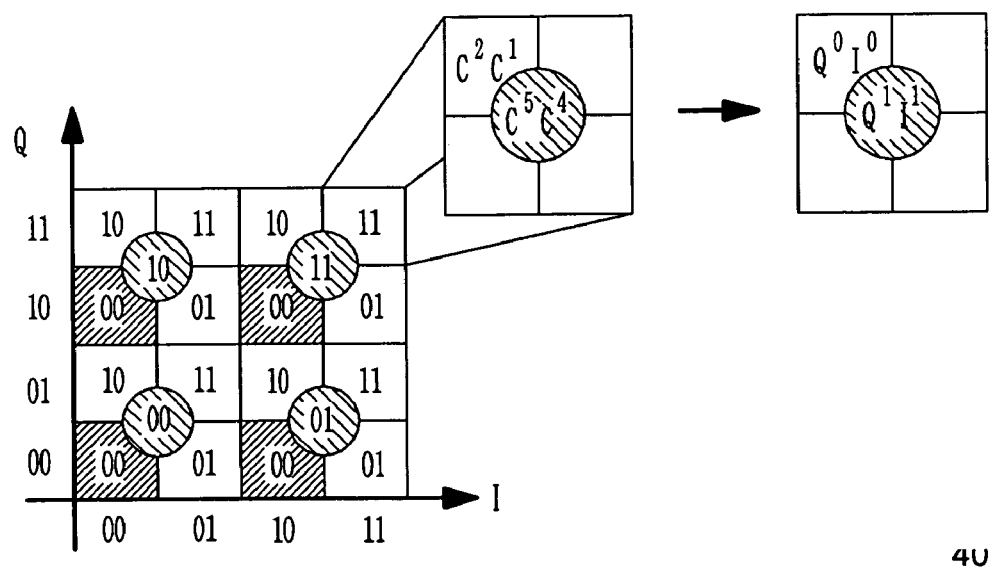
Figure 8B:
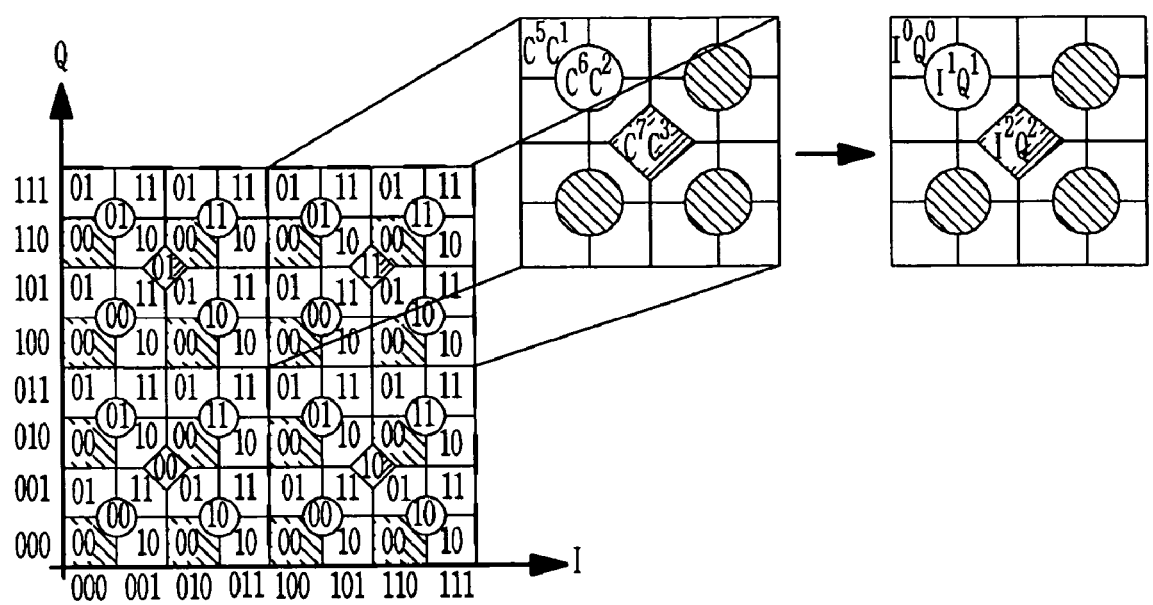

Now, the analysis results of the constellation diagrams of the 64 QAM and the 256 QAM of FIGS. 7B and 8B will be used to separate I and Q signals from the amplitude information, which is another feature of the present invention. The amplitude information is 90° rotation invariant, and therefore only the signal of the first quadrant is shown for convenience. As shown in FIGS. 7B and 8B, as the analysis results of the constellation diagrams, it was checked that the I signal is $C^4C^1$ and the Q signal is $C^5C^2$ in the 64 QAM mode, and the I signal is $C^7C^6C^5$ and the Q signal is $C^3C^2C^1$ in the 256 QAM mode.

Accordingly, the inventive I/Q signal separation unit 420 separates the I and Q signals of the first quadrant from the amplitude information on the basis of the constellation diagram analysis result. Here, the output I and Q signals are expressed using the signals of the first quadrant. The amplitude information input to the QAM symbol mapping apparatus is not separated as I and Q signals. Accordingly, the conventional art uses the input amplitude information as an address of a memory, to extract the corresponding I and Q signals, but the present invention adopts a method for directly extracting the I and Q signals from the input bit information in order to avoid use of a memory.

Figure 10:
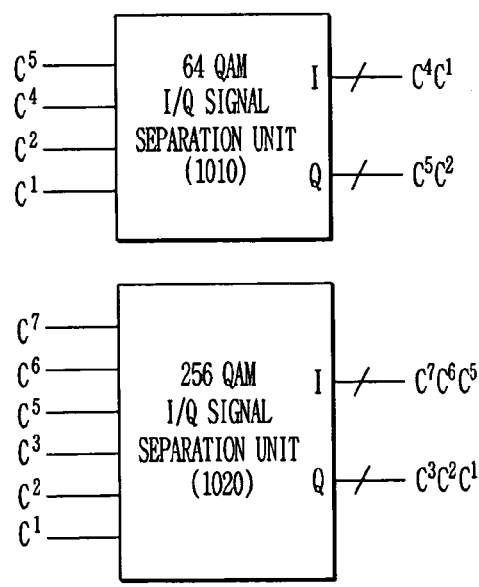
FIG. 10 illustrates a detailed construction of an I/Q signal separation unit according to an exemplary embodiment of the present invention.

FIG. 10 illustrates a detailed construction of the I/Q signal separation unit 420 according to an exemplary embodiment of the present invention.

As shown in FIG. 10, the I/Q signal separation unit 420 includes a 64 QAM I/Q signal separation unit 1010 and a 256 QAM I/Q signal separation unit 1020, which may be selectively activated depending on a modulation mode. This is an exemplary embodiment, and in another exemplary embodiment where a dual modulation mode operation is not required, only the I/Q signal separation unit necessary for a corresponding modulation mode need be provided. The 640 QAM I/Q signal separation unit 1010 receives the bits $C^5C^4C^2C^1$ representing the amplitude information and outputs $C^4C^1$ and $C^5C^2$ as I and Q signals, respectively. Similarly, the 256 QAM I/Q signal separation unit 1020 receives the bits $C^7C^6C^5C^3C^2C^1$ representing the amplitude information, and outputs $C^7C^6C^5$ and $C^3C^2C^1$ as I and Q signals, respectively.

Figure 11A:
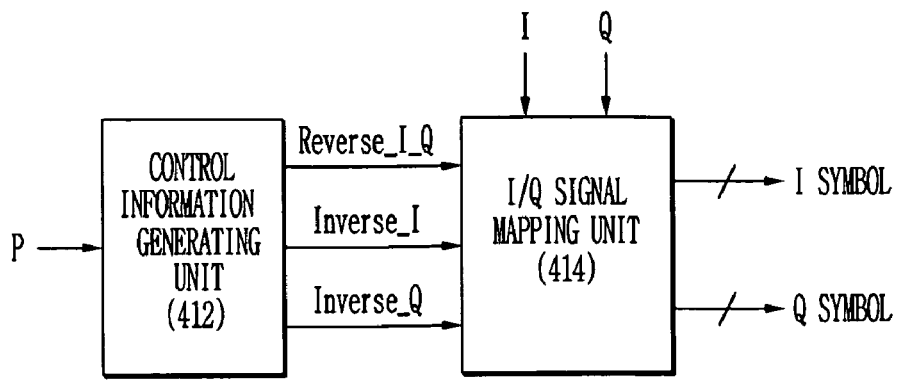
FIGS. 11A to 11C illustrate a detailed construction of a symbol generation unit according to an exemplary embodiment of the present invention.
Figure 11B:
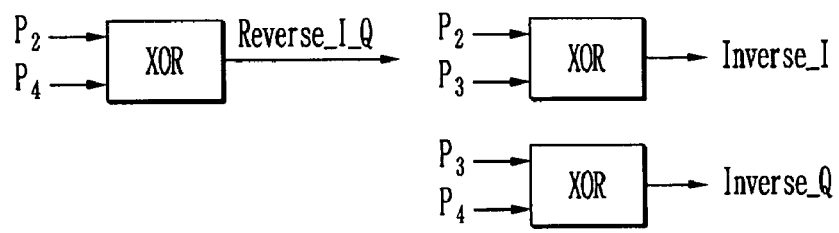
Figure 11C:
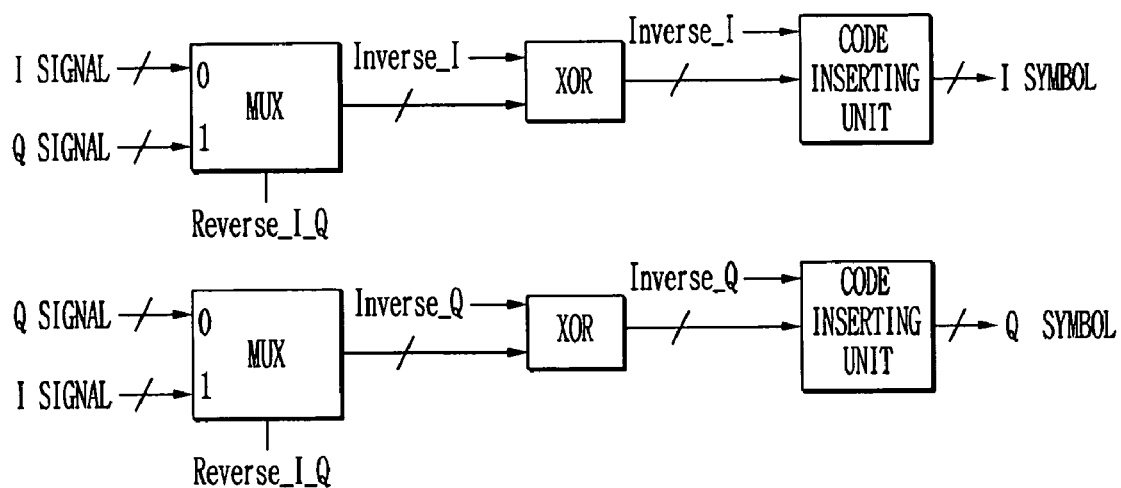

Referring again to FIG. 4, the symbol generation unit 430 receives I and Q signals expressed as the signals of the first quadrant, from the I/Q signal separation unit 420, and forms a QAM symbol using the phase information input from the phase extraction unit 410. FIGS. 11A to 11C illustrate a detailed construction of the symbol generation unit 430 according to an exemplary embodiment of the present invention.

As shown in FIG. 11A, the symbol generation unit 430 includes a control information generator 412 for receiving the phase information from the phase extraction unit 410 and calculating control information necessary for forming the symbol using the received phase information, and an I/Q signal mapping unit 414 for mapping the I and Q signals of the first quadrant calculated in the I/Q signal separation unit 420 to actual positions using the control information generated by the control information generation unit 412.

FIG. 11B illustrates a detailed logic block diagram of the control information generation unit 412. In the second and fourth quadrants, I and Q signals are exchanged, in the second and third quadrants, a sign of I signal is inverted, and in the third and fourth quadrants, a sign of Q signals is inverted. Accordingly, the control information generation unit 412 performs an XOR logic arithmetic operations on the phase information $P_2$, $P_3$, and $P_4$, and generates control signals Reverse_I_Q, Inverse_I, and Inverse_Q. The control signals are input to the I/Q signal mapping unit 414.

FIG. 11C illustrates a detailed logic block diagram of the I/Q signal mapping unit 414. As shown in FIG. 11C, the I/Q signal mapping unit 414 receives the I and Q signals of the first quadrant from the I/Q signal separation unit 420, maps the received I and Q signals to the actual positions depending on the control signals calculated from the control signal generation unit 412, and generates final I and Q symbols. Here, a sign insertion unit adds the bits expressing the sign of I and Q signals to Most Significant Bit (MSB).

As described above, in the inventive QAM symbol mapping method and apparatus, the phase information is extracted on the basis of the constellation diagram fixedly determined depending on the modulation mode, irrespective of a differential coding method. And, I and Q signals can be directly calculated from the amplitude information without using the memory, thereby using hardware efficiently, reducing cost, increasing process speed, and enhancing extendibility.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A QAM (Quadrature Amplitude Modulation) symbol mapping method performed by a QAM symbol mapping apparatus, the method comprising the steps of:
   receiving a plurality of bits at an input of the QAM symbol mapping apparatus, the plurality of bits including a first set of bits and a second set of bits, the first set including two bits that represent set partitioning information and the second set including the other bits that represent amplitude information;
   determining phase information on the basis of predetermined relations between the first set of bits and two LSBs (Least Significant Bits) of the second set of bits;
   designating a half of the second set of bits as I signals of a first quadrant and the other half of the second set of bits as Q signals of the first quadrant according to a predetermined mapping of the first quadrant; and
   mapping the I and Q signals of the first quadrant to actual positions in a QAM constellation on the basis of the determined phase information.

2. The method according to claim 1, wherein the two bits representing the set partitioning information are convolution coded bits and identically repeated irrespective of 90° rotation, and the bits representing the amplitude information are non-convolution coded bits and have a signal constellation that is 90° rotation invariant.

3. The method according to claim 1, wherein, as a result of analyzing a 64 QAM constellation diagram, in a 64 QAM modulation mode, the two bits representing the set partitioning information are $C^3$ and $C^0$ and the two LSBs of the amplitude information are $C^2$ and $C^1$, wherein the plurality of bits received at the input are $C^5$, $C^4$, $C^3$, $C^2$ $C^1$ and $C^0$.

4. The method according to claim 3, wherein the step of determining the phase information comprises the steps of:
   outputting phase information ($P_1$) representing the first quadrant in the case that $C^3=C^1$ and $C^0=C^2$;
   outputting phase information ($P_2$) representing a second quadrant in the case that $C^3=C^2$ and $C^0=C^1$;
   outputting phase information ($P_3$) representing a third quadrant in the case that $C^3=\overline{C^1}$ and $C^0=\overline{C^2}$; and
   outputting phase information ($P_4$) representing a fourth quadrant in the case that $C^3=C^2$ and $C^0=\overline{C^1}$, wherein $\overline{C^1}$ represents the complement of $C^1$, and $\overline{C^2}$ represents the complement of $C^2$.

5. The method according to claim 1, wherein as a result of analyzing a 256 QAM constellation diagram, in a 256 QAM modulation mode, the two bits representing the set partitioning information are $C^4$ and $C^0$, and the two LSBs of the amplitude information are $C^5$ and $C^1$, wherein the plurality of bits received at the input are $C^7$, $C^6$, $C^5$, $C^4$, $C^3$, $C^2$, $C^1$ and $C^0$.

6. The method according to claim 5, wherein said step of determining the phase information comprises the steps of:
   outputting phase information ($P_1$) representing the first quadrant in the case that $C^4=C^5$ and $C^0=C^1$;
   outputting phase information ($P_2$) representing a second quadrant in the case that $C^4=C^1$ and $C^0=C^5$;
   outputting phase information ($P_3$) representing a third quadrant in the case that $C^4=C^5$ and $C^0=\overline{C^1}$; and outputting phase information ($P_4$) representing a fourth quadrant in the case that $C^4=C^1$ and $C^0=\overline{C^5}$, wherein $\overline{C^1}$ represents the complement of $C^1$, $\overline{C^5}$ and represents the complement of $C^5$.

7. The method according to claim 1, wherein in said designating step, $C^4C^1$ of the amplitude information $C^5C^4C^2C^1$ is separated as the I signals of the first quadrant and $C^5C^2$ is separated as the Q signal of the first quadrant in a 64 QAM modulation mode, on the basis of a result of analyzing a 64 QAM constellation diagram, wherein the plurality of bits received at the input are $C^5$, $C^4$, $C^3$, $C^2$ $C^1$ and $C^0$.

8. The method according to claim 1, wherein in said designating step, $C^7C^6C^5$ of the amplitude information $C^7C^3C^6C^2C^5C^1$ is separated as the I signal and $C^3C^2C^1$ is separated as the Q signal in a 256 QAM modulation mode, on the basis of a result of analyzing a 256 QAM constellation diagram, wherein the plurality of bits received at the input are $C^7$, $C^6$, $C^5$, $C^4$, $C^3$, $C^2$ $C^1$ and $C^0$.

9. The method according to claim 1, wherein in said step of mapping the I and Q signals to the actual positions, the I and Q signals are switched when the phase information is $P_2$ or $P_4$, a sign of the I signal is inverted when the phase information is $P_2$ or $P_3$, and a sign of the Q signal is inverted when the phase information is $P_3$ or $P_4$, thereby mapping the I and Q signals to the actual positions, wherein $P_1$, $P_2$, $P_3$, $P_4$ represent the phase information of the first, second, third and fourth quadrants, respectively.

10. A QAM (Quadrature Amplitude Modulation) symbol mapping apparatus, comprising:
a phase information extraction means for performing predetermined arithmetic operations between a first set of bits and two LSBs (Least Significant Bits) of a second of bits, among bits received at an input for QAM symbol mapping, to extract phase information, the first set of bits representing set partitioning information and the second set of bits representing amplitude information;
an I/Q signal separating means for designating a half of the second set of bits as Q signals of a first quadrant and the other half of the second set of bits as I signals of the first quadrant according to a predetermined mapping of the first quadrant; and
a mapping means for receiving the phase information from the phase information extraction unit, and mapping the separated I and Q signals of the first quadrant to actual positions on the basis of the received phase information.

11. The apparatus according to claim 10, wherein the two bits representing the set partitioning information are convolution coded bits and identically repeated irrespective of 90° rotation, and the bits representing the amplitude information are non-convolution coded bits and have a signal constellation that is 90° rotation invariant.

12. The apparatus according to claim 10, wherein said phase information extraction means has two input units $I_1$ and $I_2$ for respectively receiving the two LSBs (Least Significant Bits) of the amplitude information, and two input units $I_3$ and $I_4$ for respectively receiving the two bits representing the set partitioning information, and extracts the phase information through logic arithmetic operations between the bits input to the input units $I_1$ and $I_2$ and the bits input to the input units $I_3$ and $I_4$.

13. The apparatus according to claim 12, wherein in a 64 QAM modulation mode, said phase information extraction means receives bits $C^2$ and $C^1$ from the input units $I_1$ and $I_2$, respectively, and receives bits $C^3$ and $C^0$ from the input units $I_3$ and $I_4$, respectively, wherein the bits received at the input are $C^5$, $C^4$, $C^3$, $C^2$ $C^1$ and $C^0$.

14. The apparatus according to claim 12, wherein in a 256 QAM modulation mode, said phase information extraction means receives bits $C^1$ and $C^5$ from the input units $I_1$ and $I_2$, respectively, and receives bits $C^4$ and $C^0$ from the input units $I_3$ and $I_4$, respectively, wherein the bits received at the input are $C^7$, $C^6$, $C^5$, $C^4$, $C^3$, $C^2$ $C^1$ and $C^0$.

15. The apparatus according to claim 13, wherein said phase information extraction means comprises:
a means for outputting phase information ($P_1$) representing the first quadrant in the case that $C^3=C^1$ and $C^0=C^2$;
a means for outputting phase information ($P_2$) representing a second quadrant in the case that $C^3=C^2$ and $C^0=C^1$;
a means for outputting phase information ($P_3$) representing a third quadrant in the case that $C^3=\overline{C^1}$ and $C^0=\overline{C^2}$; and
a means for outputting phase information ($P_4$) representing a fourth quadrant in the case that $C^3=C^2$ and $C^0=\overline{C^1}$, wherein $\overline{C^1}$ represents the complement of $C^1$, and $\overline{C^2}$ represents the complement of $C^2$.

16. The apparatus according to claim 14, wherein said phase information extraction means comprises:
a means for outputting phase information ($P_1$) representing the first quadrant in the case that $C^4=C^5$ and $C^0=C^1$;
a means for outputting phase information ($P_2$) representing a second quadrant in the case that $C^4=C^1$ and $C^0=C^5$;
a means for outputting phase information ($P_3$) representing a third quadrant in the case that $C^4=\overline{C^5}$ and $C^0=\overline{C^1}$; and
a means for outputting phase information ($P_4$) representing a fourth quadrant in the case that $C^4=C^1$ and $C^0=\overline{C^5}$, wherein $\overline{C^1}$ represents the complement of $C^1$, and $\overline{C^5}$ represents the complement of $C^5$.

17. The apparatus according to claim 10, wherein said I and Q signal separation means comprises:
a means for separating $C^4C^1$ as the I signal of the first quadrant and separating $C^5C^2$ as the Q signal of the first quadrant in a 64 QAM modulation mode; and
a means for separating $C^7C^6C^5$ as the I signal and separating $C^3C^2C^1$ as the Q signal in a 256 QAM modulation mode, wherein the bits received at the input are $C^7$, $C^6$, $C^5$, $C^4$, $C^3$, $C^2$, $C^1$, and $C^0$.

18. The apparatus according to claim 10, wherein said mapping means comprises:
a control information generation means for performing a logic arithmetic operation on the phase information to generate control information for the I and Q signals; and
a mapping means for mapping the I and Q signals of the first quadrant to actual positions, on the basis of the control information generated from said control information generation means.

19. The apparatus according to claim 18, wherein said control information generation means comprises:
a means for generating a control signal (Reverse_I_Q) switching the I and Q signals with each other when the phase information is $P_2$ or $P_4$;
a means for generating a control signal (Inverse_I) inverting a sign of the I signal when the phase information is $P_2$ or $P_3$; and
a means for generating a control signal (Inverse_Q) inverting a sign of the Q signal when the phase information is $P_3$ or $P_4$, wherein $P_1$, $P_2$, $P_3$, $P_4$ represent the phase information of the first, second, third and fourth quadrants, respectively.

20. A QAM system comprising:

a data formatting means for separating RS symbol bits into at least one group bits according to a predetermined rule;

a coder for receiving the group bits from the data formatting means, and coding the portion of the received group bits; and a symbol mapping apparatus according to any one of claims 10 to 19, for receiving the group bits from the data formatting means and performing symbol mapping on the group of bits.

* * * * *